United States Patent
Taniguchi

(10) Patent No.: US 10,247,241 B2
(45) Date of Patent: Apr. 2, 2019

(54) ROLLING BEARING

(71) Applicant: JTEKT CORPORATION, Osaka-shi, Osaka (JP)

(72) Inventor: Youzou Taniguchi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/635,314

(22) Filed: Jun. 28, 2017

(65) Prior Publication Data

US 2018/0010637 A1    Jan. 11, 2018

(30) Foreign Application Priority Data

Jul. 5, 2016 (JP) ................................. 2016-133745

(51) Int. Cl.
*F16C 33/38* (2006.01)
*F16C 19/06* (2006.01)

(52) U.S. Cl.
CPC .......... *F16C 33/3875* (2013.01); *F16C 19/06* (2013.01); *F16C 2220/04* (2013.01); *F16C 2226/74* (2013.01)

(58) Field of Classification Search
CPC ............. F16C 33/3862; F16C 33/3875; F16C 2226/74; F16C 19/06; F16C 2220/04; F16B 21/06; F16B 5/0016

See application file for complete search history.

(56) References Cited

U.S. PATENT DOCUMENTS

| 7,703,986 B2 * | 4/2010 | Naito | F16C 33/3875 |
| | | | 384/526 |
| 2007/0230849 A1 * | 10/2007 | Naito | F16C 33/3875 |
| | | | 384/530 |
| 2014/0186104 A1 * | 7/2014 | Hamberger | E04F 13/0894 |
| | | | 403/292 |
| 2015/0010258 A1 * | 1/2015 | Fujimi | F16C 33/3875 |
| | | | 384/527 |
| 2016/0215822 A1 * | 7/2016 | Yasuda | F16C 33/3875 |
| 2017/0292567 A1 * | 10/2017 | Taniguchi | F16C 33/38 |

FOREIGN PATENT DOCUMENTS

| DE | 3319142 | * 12/1983 | |
| JP | 2008121817 A | * 5/2008 | .......... F16C 33/3875 |
| JP | 2009-144878 A | 7/2009 | |
| JP | 2009168110 A | * 7/2009 | .......... F16C 33/3875 |

* cited by examiner

*Primary Examiner* — Alan B Waits
(74) *Attorney, Agent, or Firm* — Oliff PLC

(57) ABSTRACT

A rolling bearing includes a cage constructed by coupling a pair of split members that are split into halves in an axial direction of the rolling bearing. At least one of the split members has an engagement portion that protrudes in the axial direction toward the other one of the split members. The other one of the split members has an engagement groove that extends along the axial direction and houses the engagement portion. The engagement groove has an insertion port through which the engagement portion is inserted in the axial direction. The insertion port is formed at an end of the engagement groove that is closer to the one of the split members. At least one circumferential face of the engagement groove includes a first inclined surface that increases a circumferential width of the insertion port toward the one of the split members.

3 Claims, 11 Drawing Sheets

ROLLING BEARING

INCORPORATION BY REFERENCE

The disclosure of Japanese Patent Application No. 2016-133745 filed on Jul. 5, 2016 including the specification, drawings and abstract, is incorporated herein by reference in its entirety.

BACKGROUND OF THE INVENTION

1. Field of the Invention

The present invention relates to a rolling bearing including a two-piece cage.

2. Description of the Related Art

As a cage configured to retain rolling elements provided between an inner ring and an outer ring of a rolling bearing, a so-called fully-encasing cage is known (see, for example, Japanese Patent Application Publication No. 2009-144878 (JP 2009-144878 A)). For example, as illustrated in FIG. 9 and FIG. 10, a fully-encasing cage 114 includes a pair of annular portions 115 and a plurality of cage bars 116 connecting the annular portions 115 to each other. Pockets 117 are each provided between the pair of annular portions 115 and between a pair of cage bars 116 adjacent to each other in a circumferential direction. The pockets 117 retain rolling elements 113 arranged between inner and outer rings 111 and 112.

The cage 114 illustrated in FIG. 10 is a two-piece cage, which is constructed by coupling a pair of annular split members 121a and 121b to each other. Each of the pair of split members 121a and 121b includes an annular portion 115 on one side and split cage bars 122a or 122b extending in an axial direction from the annular portion 115. The cage bars 116 are formed by coupling the split cage bars 122a and 122b on both sides to each other. The split cage bars 122a and 122b are coupled to each other such that engagement portions 124 formed on each split member 121a or 121b engage with engagement grooves 131 formed on the mating split member 121b or 121a.

The two-piece cage illustrated in FIG. 9 and FIG. 10 is assembled as follows. As illustrated in FIG. 11, the pair of split members 121a and 121b are brought closer to each other in the axial direction while being set in phase with each other in the circumferential direction. The engagement portions 124 are inserted into the engagement grooves 131 in the axial direction so as to cause the engagement portions 124 to engage with the engagement grooves 131. Even if the pair of split members are slightly out of phase with each other in the circumferential direction, however, distal corner portions 124c of the engagement portions 124 interfere with circumferential edges 131d of the engagement grooves 131. As a result, it is difficult to insert the engagement portions 124 into the engagement grooves 131.

SUMMARY OF THE INVENTION

It is one object of the present invention to provide a rolling bearing in which engagement portions can easily be inserted into engagement grooves when a pair of split members constituting a cage are coupled to each other, whereby the assembling workability of the rolling bearing can be improved.

A rolling bearing according to one aspect of the present invention has the following features in its structure. That is, the rolling bearing includes a pair of bearing rings arranged so as to face each other in a radial direction, a plurality of rolling elements interposed between the pair of bearing rings, and a cage including a pair of annular portions and a plurality of cage bars connecting the pair of annular portions to each other. The cage has pockets for housing the rolling elements. Each of the pockets is formed between the pair of annular portions and between the cage bars adjacent to each other in a circumferential direction. The cage is constructed by coupling a pair of split members that are split into halves in an axial direction of the rolling bearing. At least one of the split members has an engagement portion that protrudes in the axial direction toward the other one of the split members. The other one of the split members has an engagement groove that extends along the axial direction and houses the engagement portion. The engagement groove has an insertion port through which the engagement portion is inserted in the axial direction. The insertion port is formed at an end of the engagement groove that is closer to the one of the split members. At least one circumferential face of the engagement groove includes a first inclined surface that increases a circumferential width of the insertion port toward the one of the split members.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
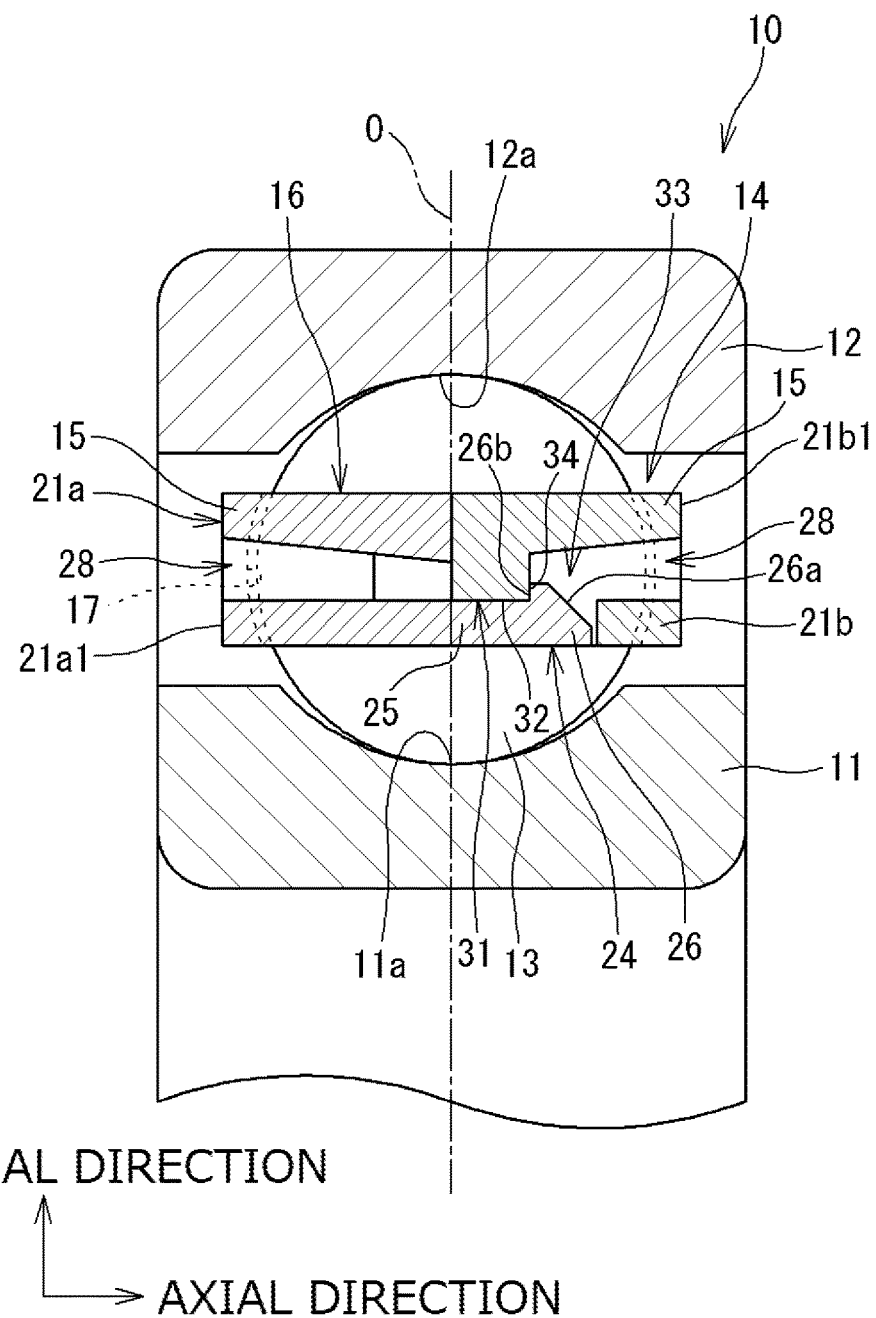
FIG. 1 is a sectional view of a rolling bearing according to one embodiment.

Embodiments of the present invention are described below with reference to the drawings. FIG. 1 is a sectional view of a rolling bearing according to one embodiment. A rolling bearing 10 includes a pair of bearing rings 11 and 12, a plurality of rolling elements 13, and a cage 14. In the following description, the side located closer to an axial center O of the rolling bearing 10 may be referred to as an axially inner side (or axially inward) and the side located farther away from the axial center O may be referred to as an axially outer side (or axially outward).

The pair of bearing rings 11 and 12 are constituted by an annular inner ring 11 and an annular outer ring 12 arranged so as to face a radially outer side of the inner ring 11. The plurality of rolling elements 13 are arranged between the inner ring 11 and the outer ring 12. In this embodiment, the rolling element 13 is a ball and the rolling bearing 10 is a deep groove ball bearing.

Figure 2:
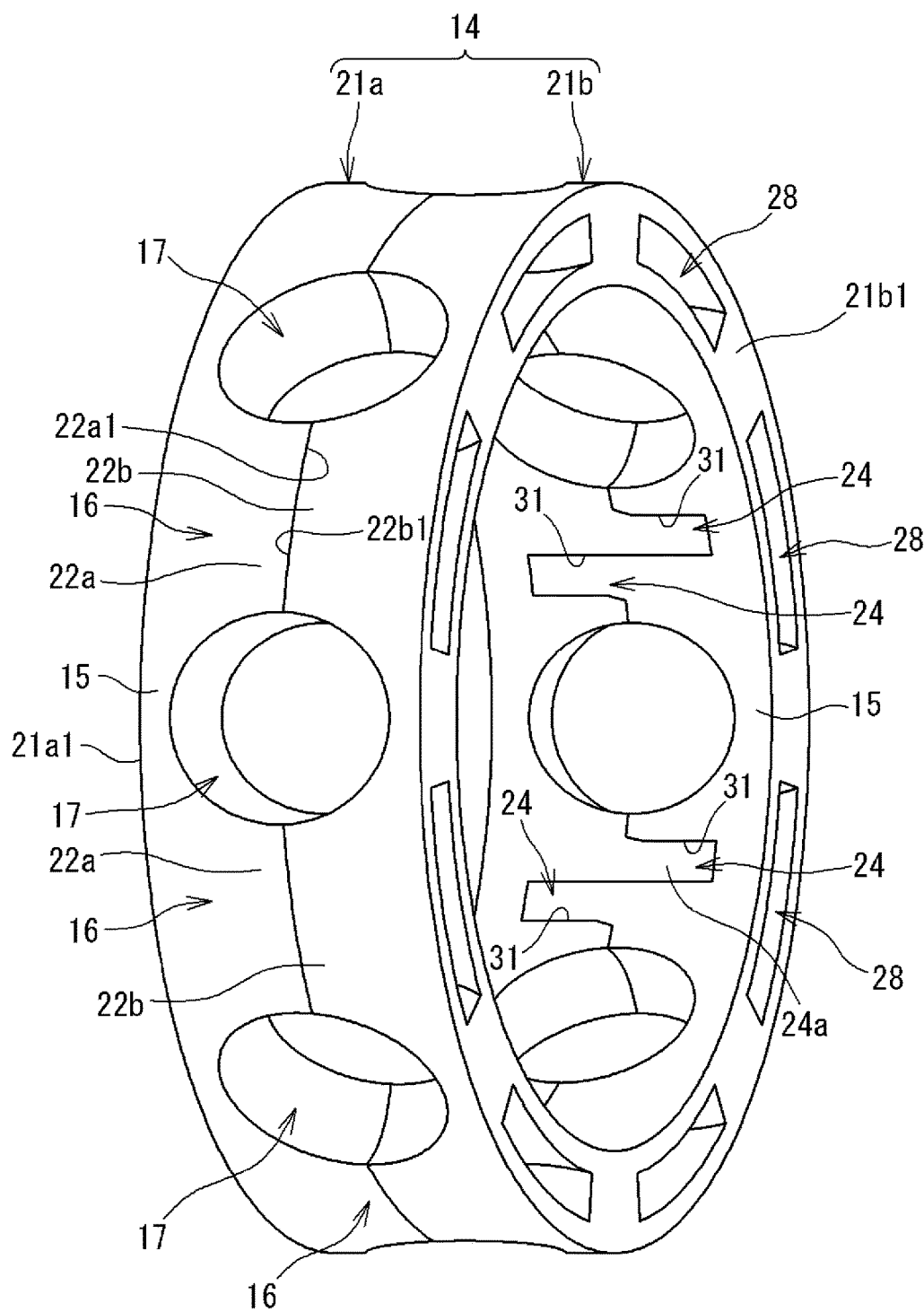
FIG. 2 is a perspective view illustrating a cage of the rolling bearing.

A raceway 11a where the balls 13 roll is formed on the outer peripheral surface of the inner ring 11. The raceway 11a is formed into a substantially concave arc shape in cross section. A raceway 12a where the balls 13 roll is formed on the inner peripheral surface of the outer ring 12. The raceway 12a is formed into a substantially concave arc shape in cross section. FIG. 2 is a perspective view illustrating the cage 14 of the rolling bearing 10. As illustrated in FIG. 1 and FIG. 2, the cage 14 keeps circumferential intervals between the plurality of balls 13. The cage 14 includes a pair of annular portions 15 located on both sides of the balls 13 in the axial direction, and a plurality of cage bars 16 connecting the pair of annular portions 15 to each other. Pockets 17 are each provided between the pair of annular portions 15 and between the cage bars 16 adjacent to each other in the circumferential direction. The pockets 17 house the balls 13. The cage 14 is a fully-encasing cage configured to retain the balls 13 from both sides in the axial direction.

The pocket 17 is formed into a circular shape when viewed in the radial direction. The inner surface of the pocket 17 has a shape of a concave surface along a spherical surface having a radius of curvature that is slightly larger than that of the outer peripheral surface of the ball 13. Therefore, a small clearance is formed between the pocket 17 and the outer peripheral surface of the ball 13. The pocket 17 may be formed into a quadrangular shape when viewed in the radial direction so that the ball 13 can be brought into contact with each side of the pocket 17.

On axially outer end faces 21a1 and 21b1 of the cage 14, a plurality of back recessed portions 28 are provided with circumferential intervals therebetween. The back recessed portions 28 are recessed axially inward. As illustrated in FIG. 2, the cage 14 is constituted by a pair of split members 21a and 21b that are split into halves in the axial direction. That is, a single cage 14 is formed by coupling the pair of split members 21a and 21b to each other. Each of the split members 21a and 21b is formed of a synthetic resin, and is molded by injection molding or the like. Each of the pair of split members 21a and 21b includes an annular portion 15 on one side and split cage bars 22a or 22b. Each of the split cage bars 22a and 22b extends from the annular portion 15 toward the mating split member 21a or 21b. Each of the split cage bars 22a and 22b is a half of the cage bar 16. The pair of split members 21a and 21b are formed into the same shape, and the cage 14 is constructed by coupling the split cage bars 22a and 22b in abutment against each other in a state in which one of the pair of split members 21a and 21b is reversed.

Figure 3:
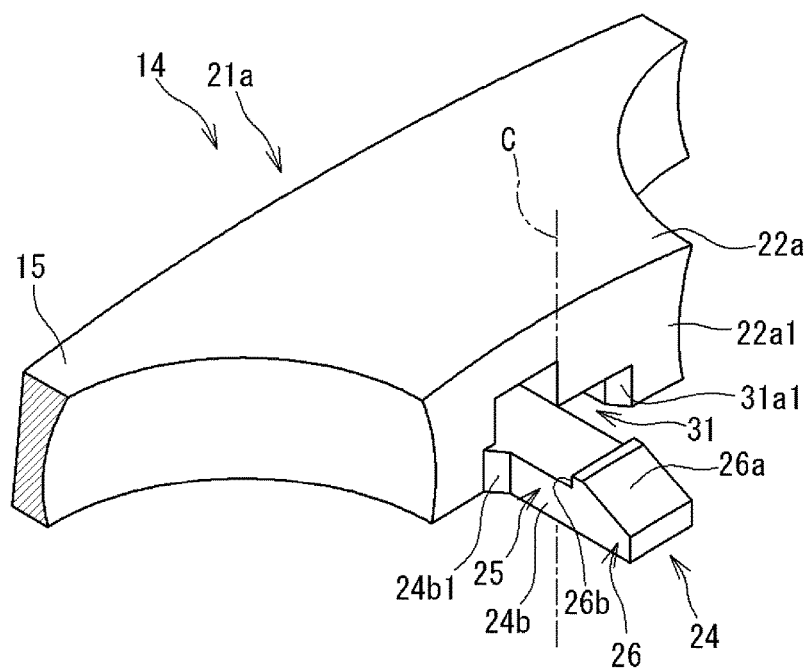
FIG. 3 is a perspective view illustrating a part of one split member of the cage.
Figure 4:
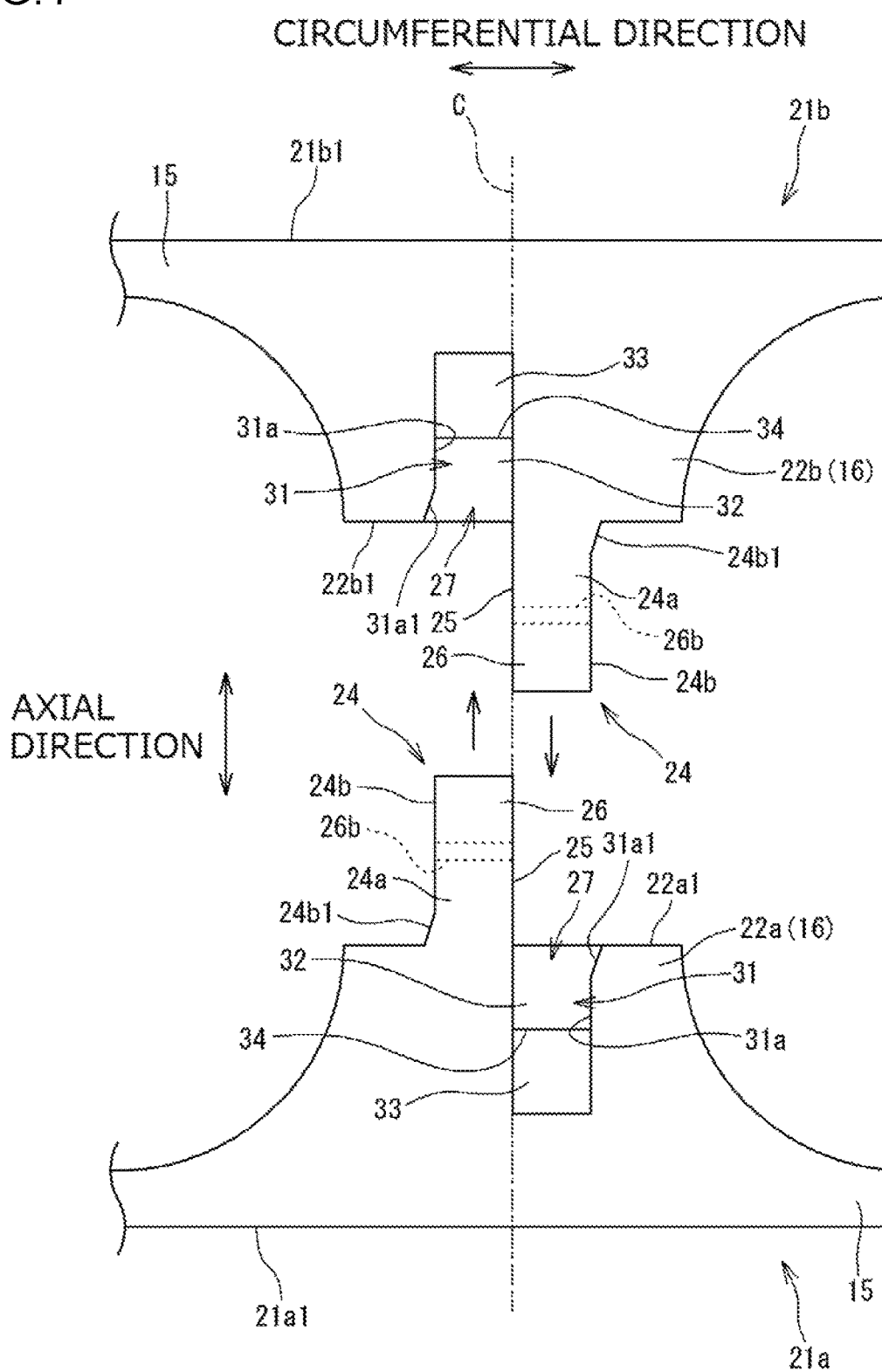
FIG. 4 is a view of a part of a pair of disassembled split members, which are viewed from a radially inner side.

FIG. 3 is a perspective view illustrating a part of one split member 21a of the cage 14. FIG. 4 is a view of a part of the pair of disassembled split members 21a and 21b, which are viewed from a radially inner side. In FIG. 3, the structure of the other split member 21b is totally the same as that of the one split member 21a except that the other split member 21b is oriented toward the opposite side in the axial direction. As illustrated in FIG. 2 to FIG. 4, engagement portions 24 are provided on distal end faces 22a1 and 22b1 of the split cage bars 22a and 22b of the split members 21a and 21b. Each engagement portion 24 extends in the axial direction toward the mating split member 21b or 21a. The engagement portion 24 is provided on a radially inner part of the distal end face 22a1 or 22b1 of the split cage bar 22a or 22b at a position shifted to one side in the circumferential direction from a circumferential center C. A radially inner surface 24a of the engagement portion 24 constitutes a part of the inner peripheral surface of the split member 21a or 21b.

The engagement portion 24 includes a body portion 25 formed substantially into a bar shape, and an engagement protrusion 26 provided at the distal end of the body portion 25. The body portion 25 is formed into a shape of a quadrangular solid having a substantially quadrangular shape in cross section. The engagement protrusion 26 has a circumferential width equal to that of the body portion 25 and a radial height larger than that of the body portion 25. The engagement protrusion 26 is flush with the radially inner surface of the body portion 25, and protrudes radially outward with respect to the radially outer surface of the body portion 25. The radially outer surface of the engagement protrusion 26 includes an inclined surface 26a having a decreasing radial height toward the distal end of the engagement portion 24. The axially inner face of the engagement protrusion 26, that is, a stepped surface 26b between the engagement protrusion 26 and the body portion 25 (see FIG. 3) serves as an engagement surface that engages with an engagement groove 31 described later.

The engagement grooves 31 are formed on the inner peripheral surfaces of the split members 21a and 21b. Each engagement groove 31 extends in the axial direction. The engagement groove 31 is open at the distal end face 22a1 or 22b1 (axially inner end face) of the split cage bar 22a or 22b. The engagement groove 31 is provided at a position shifted opposite to the engagement portion 24 from the circumferential center C of the distal end face 22a1 or 22b1 of the split cage bar 22a or 22b. In this embodiment, the engagement portion 24 and the engagement groove 31 are adjacent to each other across the circumferential center C.

As illustrated in FIG. 1, the engagement groove 31 includes a shallow groove portion 32 arranged on the axially inner side of the cage 14, and a deep groove portion 33 arranged on the axially outer side of the cage 14. The body portion 25 of the engagement portion 24 is inserted into the shallow groove portion 32, and the engagement protrusion 26 of the engagement portion 24 is inserted into the deep groove portion 33. The shallow groove portion 32 has a circumferential groove width and a radial groove depth that are set substantially equal to or slightly larger than the circumferential width and the radial height of the body portion 25. The shallow groove portion 32 has an axial length substantially equal to that of the body portion 25.

The deep groove portion 33 has a groove width equal to that of the shallow groove portion 32, and is formed radially deeper than the shallow groove portion 32. The groove width of the deep groove portion 33 is set substantially equal to or slightly larger than the width of the engagement protrusion 26. The deep groove portion 33 of this embodiment is formed such that the engagement groove 31 communicates with the back recessed portion 28 formed on the axially outer end face of the cage 14. The deep groove portion 33 is constituted substantially by an axially inner part of the back recessed portion 28.

The engagement portion 24 is housed in the engagement groove 31 when the engagement portion 24 is inserted into the engagement groove 31. In this state, the engagement surface 26b of the engagement protrusion 26 is brought into abutment against a stepped surface 34 between the shallow groove portion 32 and the deep groove portion 33, so that the engagement protrusion 26 engages with the engagement groove 31. Thus, the pair of split members 21a and 21b are coupled to each other without being separated away from each other in the axial direction.

Figure 5:
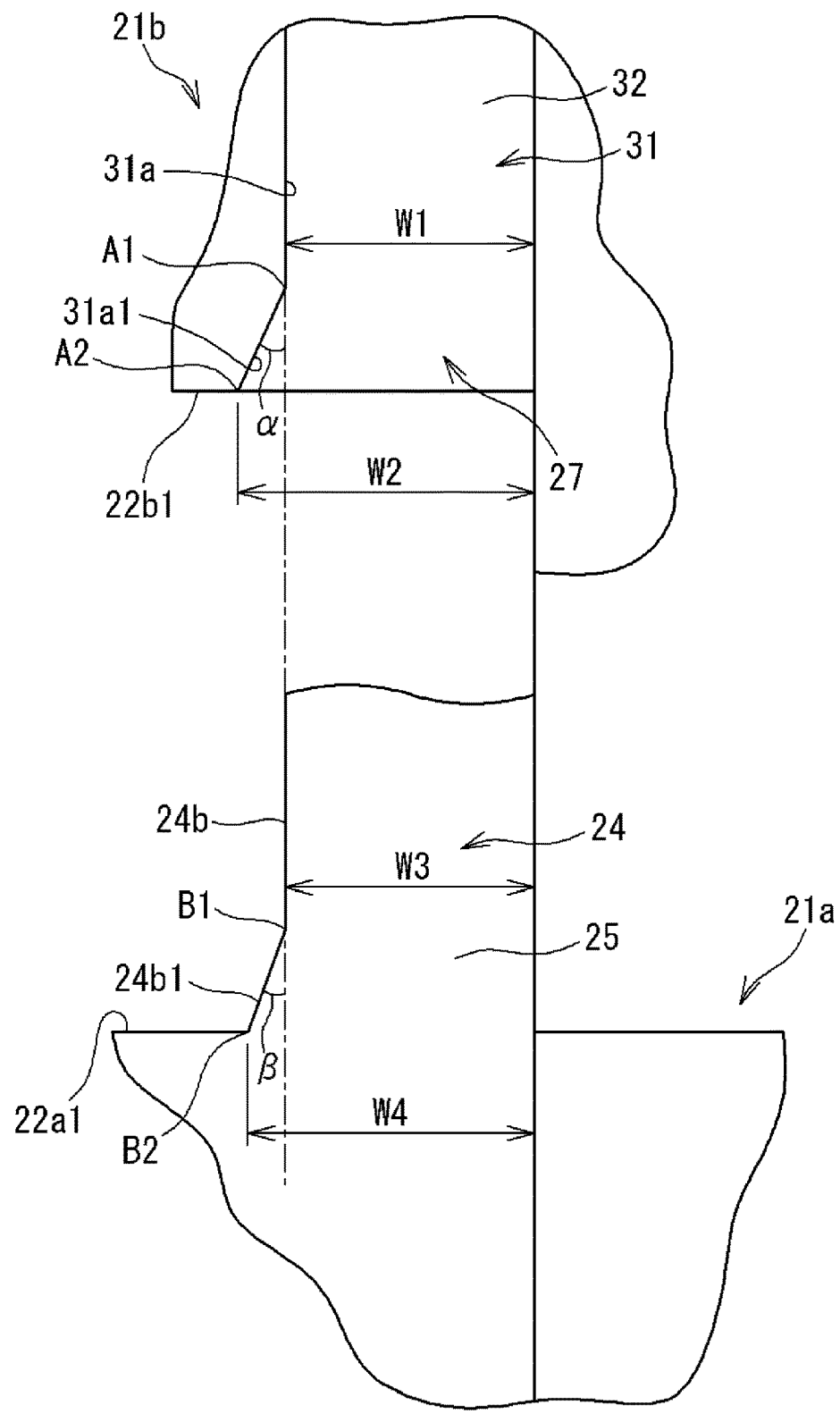
FIG. 5 is an enlarged view of an engagement portion and an engagement groove of the pair of disassembled split members, which are viewed from the radially inner side.

FIG. 5 is an enlarged view of the engagement portion 24 and the engagement groove 31 of the pair of disassembled split members 21a and 21b, which are viewed from the radially inner side. As illustrated in FIG. 4 and FIG. 5, the axially inner end of the engagement groove 31 is an insertion port 27 through which the engagement portion 24 is inserted in the axial direction. In each of the split members 21a and 21b, one circumferential face 31a of the engagement groove 31, specifically, a face 31a located opposite to the side where the engagement portion 24 is adjacent to the engagement groove 31 as illustrated in FIG. 5 includes a first inclined surface 31a1 that increases the circumferential width of the insertion port 27 toward the mating split member 21a or 21b. Specifically, the first inclined surface 31a1 increases the width of the engagement groove 31 from W1 to W2 at the insertion port 27. In FIG. 5, the ends of the first inclined surface 31a1 are represented by "A1" and "A2".

In each of the split members 21a and 21b, one circumferential face 24b of the engagement portion 24, specifically, a face 24b located opposite to the side where the engagement portion 24 is adjacent to the engagement groove 31 includes a second inclined surface 24b1 that increases the circumferential width of the proximal end of the engagement portion 24 with increasing distance from the mating split member 21a or 21b. Specifically, the second inclined surface 24b1 increases the width of the proximal end of the engagement portion 24 from W3 to W4. When the pair of split members 21a and 21b are coupled to each other, the first inclined surface 31a1 and the second inclined surface 24b1 are arranged so as to face each other. In FIG. 5, the ends of the second inclined surface 24b1 are represented by "B1" and "B2".

Figure 6:
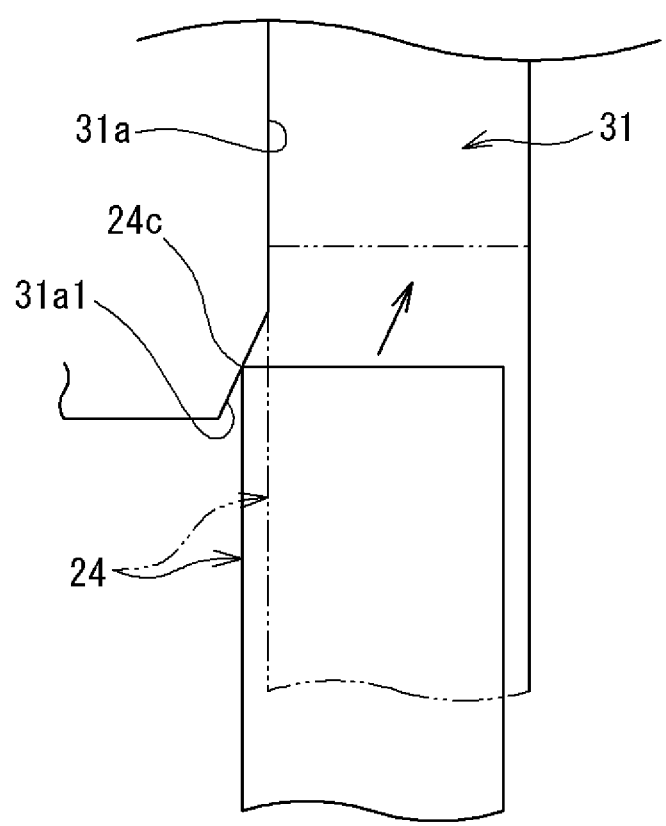
FIG. 6 is an enlarged view of how the engagement portion is inserted into the engagement groove when viewed from the radially inner side.

FIG. 6 is a view illustrating how the engagement portion 24 is inserted into the engagement groove 31 when viewed from the radially inner side. When the split members 21a and 21b are out of phase with each other in the circumferential direction at the time of inserting the engagement portion 24 into the engagement groove 31 in the axial direction, a distal corner portion 24c of the engagement portion 24 is brought into abutment against the first inclined surface 31a1 to correct the circumferential position of the engagement portion 24. As a result, the entire engagement portion 24 can smoothly be inserted into the engagement groove 31. That is, the first inclined surface 31a1 functions as a guide surface that guides the engagement portion 24 to the engagement groove 31.

As illustrated in FIG. 5, the second inclined surface 24b1 increases the circumferential width of the proximal end of the engagement portion 24 as compared to the width of the other part of the engagement portion 24. As a result, the strength of the proximal end of the engagement portion 24 can be increased. In particular, the second inclined surface 24b1 can suitably increase the strength of the engagement portion 24 against a circumferential load of the rolling bearing 10.

Figure 7:
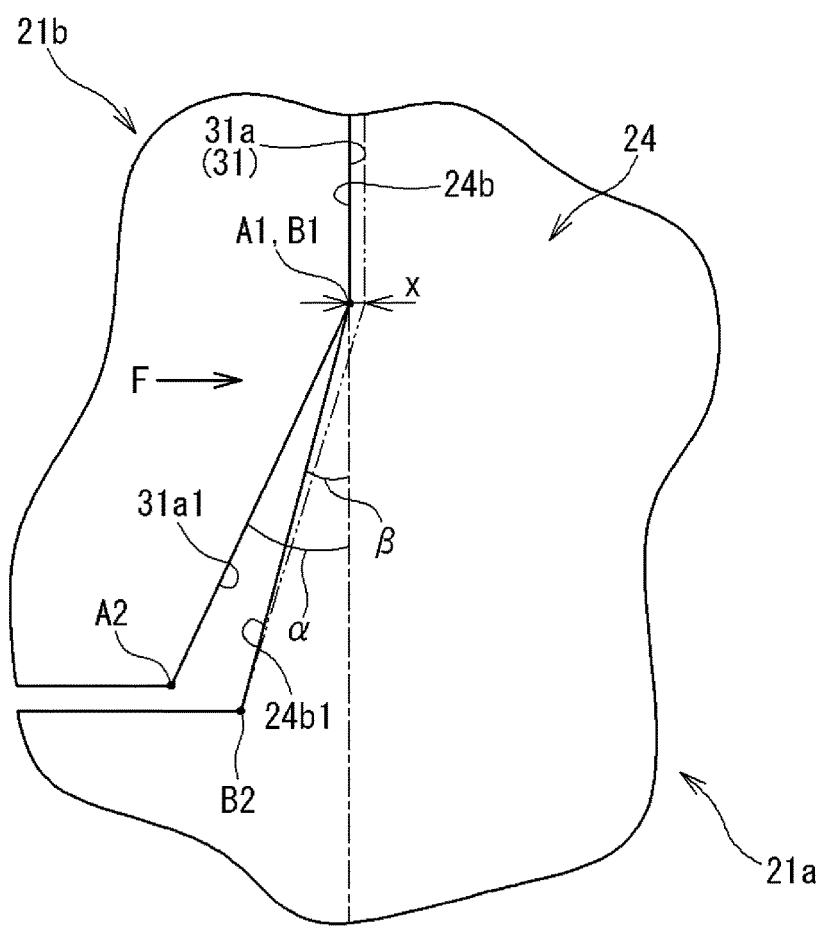
FIG. 7 is an explanatory view illustrating a relationship between a first inclined surface and a second inclined surface.

FIG. 7 is an explanatory view illustrating a relationship between the first inclined surface 31a1 and the second inclined surface 24b1. As illustrated in FIG. 5 and FIG. 7, an inclination angle α of the first inclined surface 31a1 with respect to the axial direction is set larger than an inclination angle β of the second inclined surface 24b1 with respect to the axial direction. Therefore, in a state in which the engagement portion 24 is inserted into and engages with the engagement groove 31, a clearance is formed between the first inclined surface 31a1 and the second inclined surface 24b1 as illustrated in FIG. 7.

Figure 8:
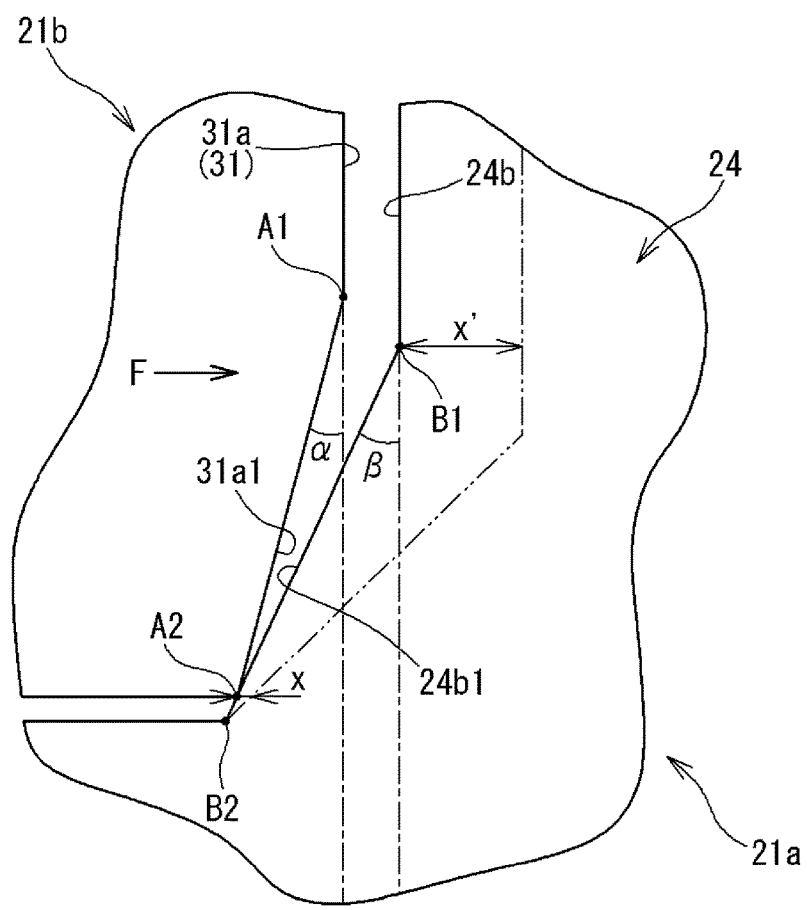
FIG. 8 is an explanatory view illustrating a modified example of the relationship between the first inclined surface and the second inclined surface.
Figure 9:
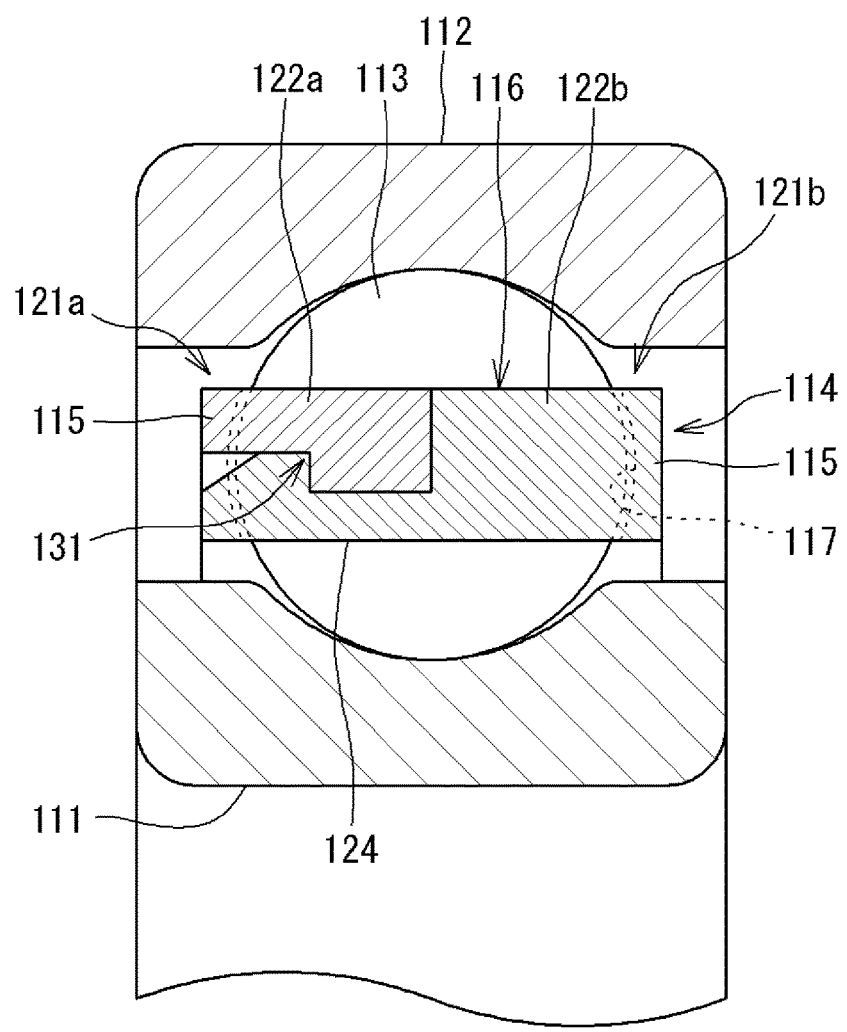
FIG. 9 is a sectional view illustrating a rolling bearing according to a related art.
Figure 10:
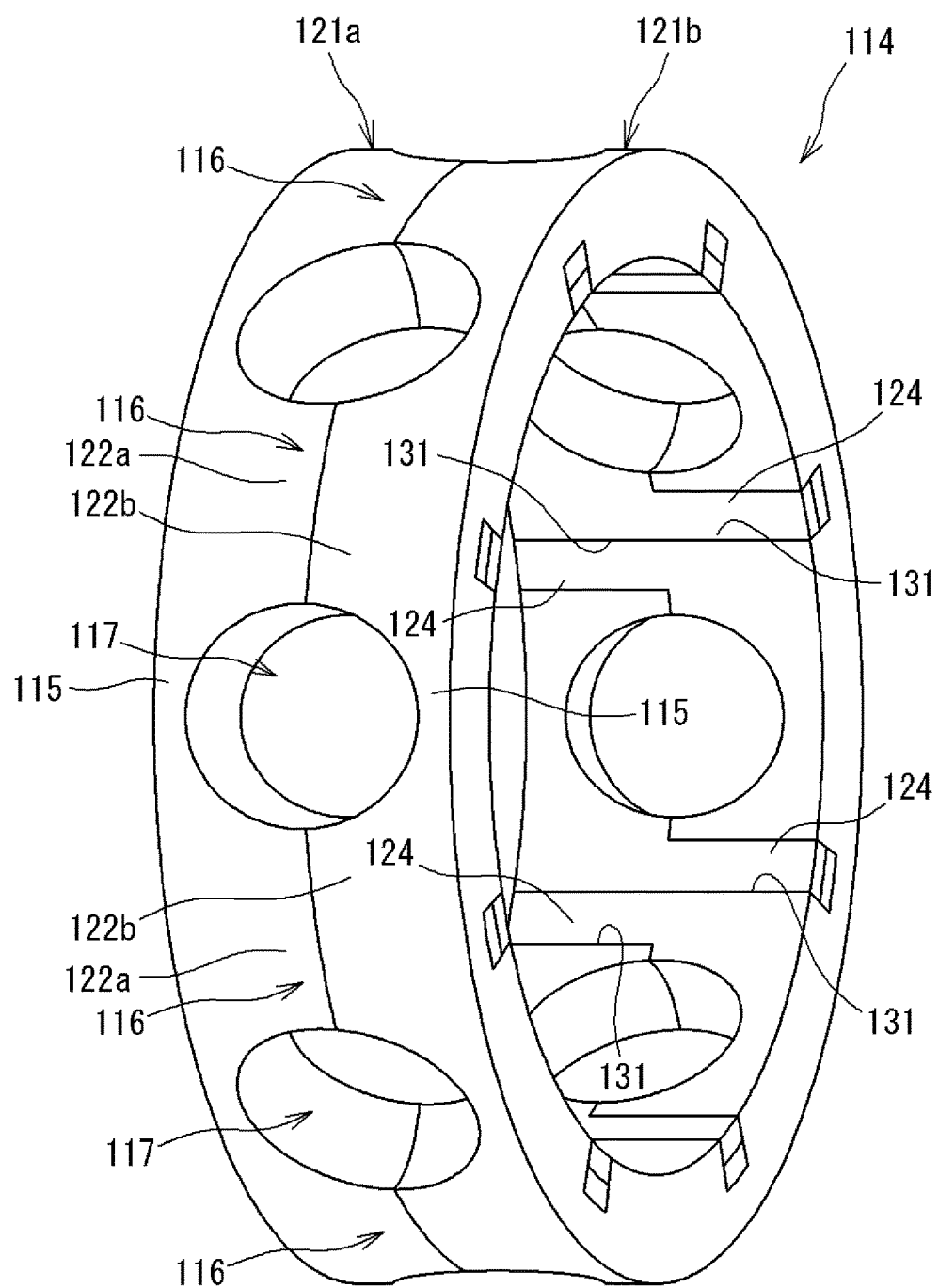
FIG. 10 is a perspective view illustrating a cage of the rolling bearing according to the related art.
Figure 11:
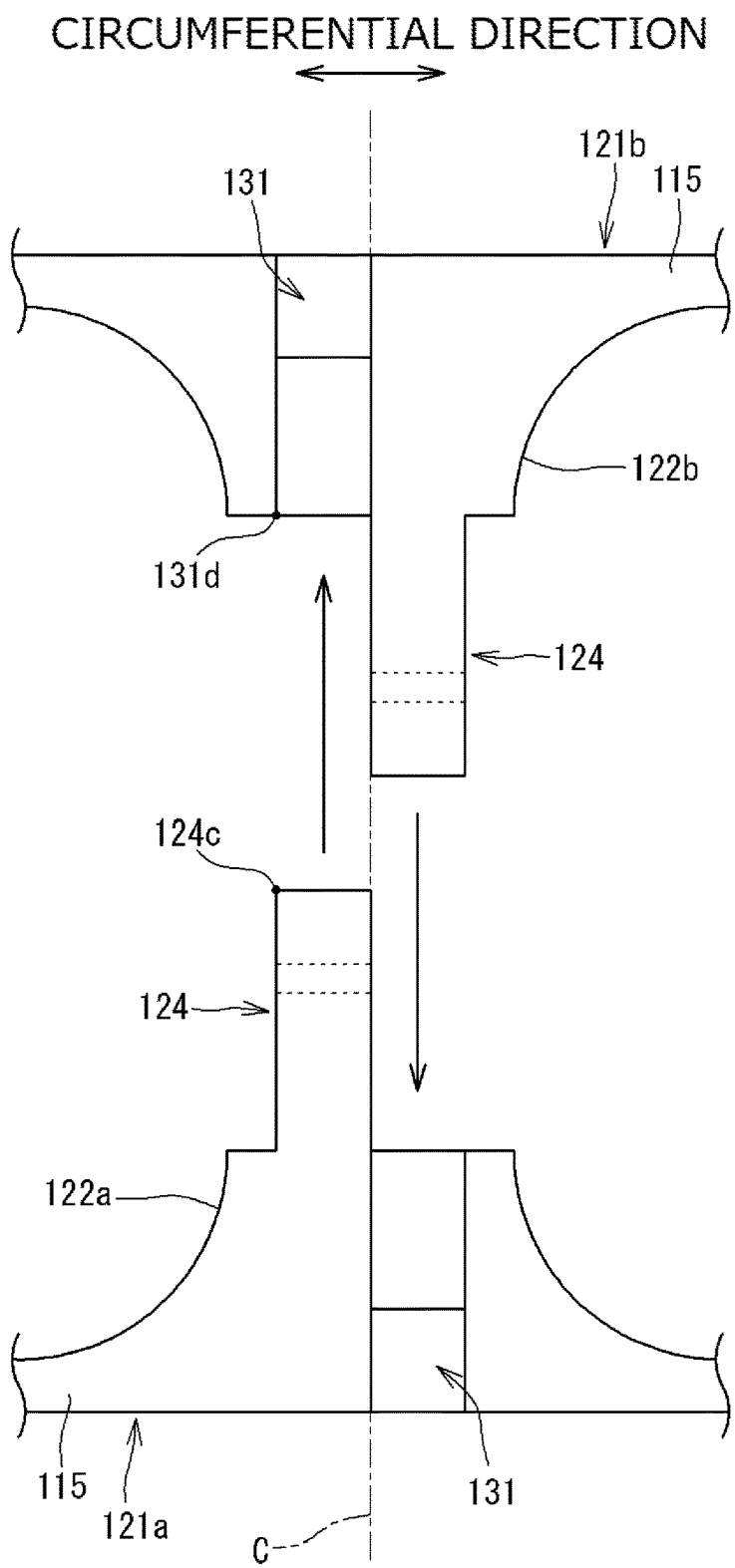
FIG. 11 is a view of a pair of disassembled split members of the cage of the related art, which are viewed from the radially inner side.

FIG. 8 is an explanatory view illustrating a modified example of the relationship between the first inclined surface 31a1 and the second inclined surface 24b1. As illustrated in FIG. 8, in the modified example, the inclination angle α of the first inclined surface 31a1 with respect to the axial direction is set smaller than the inclination angle β of the second inclined surface 24b1 with respect to the axial direction. Therefore, in a state in which the engagement portion 24 is inserted into and engages with the engagement groove 31, clearances are formed between the first inclined surface 31a1 and the second inclined surface 24b1 and between the face 31a of the engagement groove 31 and the face 24b of the engagement portion 24.

When the rolling element 13 moves with a delay due to rotation of the rolling bearing 10, the rolling element 13 strikes against the inner surface of the pocket 17 of the cage 14, so that the cage 14 is subjected to a circumferential load. As illustrated in FIG. 7, when a force F indicated by an arrow is applied to the engagement portion 24 from the face 31a of the engagement groove 31 of one split member 21b, one end A1 of the first inclined surface 31a1 and one end B1 of the second inclined surface 24b1 are brought into contact with each other, and the face 24b of the engagement portion 24 and the face 31a of the engagement groove 31 are brought into contact with each other. Then, the engagement portion 24 is deformed as indicated by a long dashed double-short dashed line. The deformation amount of the engagement portion 24 at a part in contact with the engagement groove 31 is represented by "x".

In the case of the modified example illustrated in FIG. 8, when the force F indicated by the arrow is applied to the engagement portion 24 from the face 31a of the engagement groove 31 of one split member 21b, one end A2 of the first inclined surface 31a1 is brought into abutment against the second inclined surface 24b1. When the deformation amount of the engagement portion 24 at a part in contact with the engagement groove 31 is "x" similarly to FIG. 7, the engagement portion 24 may be deformed by an amount x' larger than the amount x at a part closer to the distal end with respect to the contact part. Therefore, in the modified example illustrated in FIG. 8, a stress generated in the engagement portion 24 is larger than that of the embodiment illustrated in FIG. 7. Thus, it is more preferred that the inclination angle α of the first inclined surface 31a1 and the inclination angle β of the second inclined surface 24b1 be set in a relationship of α>β.

The present invention is not limited to the embodiment described above, and may be modified in terms of design within the scope of the invention described in the claims. For example, the first inclined surface 31a1 and the second inclined surface 24b1 are not limited to flat surfaces, and may be curved surfaces. Further, the inclination angle α of the first inclined surface 31a1 and the inclination angle β of the second inclined surface 24b1 may be equal to each other. Still further, the second inclined surface 24b1 may be omitted from the viewpoint of facilitating the insertion of the engagement portion 24 into the engagement groove 31.

In the embodiment described above, the engagement portion 24 and the engagement groove 31 are formed on both of the pair of split members 21a and 21b, but only the engagement portion 24 may be formed on one of the pair of split members 21a and 21b and only the engagement groove 31 may be formed on the other. In each of the split members 21a and 21b, only one of the engagement portion 24 and the engagement groove 31 may be formed on one split cage bar 22a or 22b.

In the embodiment described above, the engagement groove 31 with which the engagement portion 24 engages may be open at both axial ends of each of the split members 21a and 21b. Further, in each of the split members 21a and 21b, the engagement portion 24 and the engagement groove 31 need not be adjacent to each other in the circumferential direction, and may be formed with a distance therebetween in the circumferential direction. In this case, the first inclined surface can be formed on the faces of the engagement groove 31 that are located on both sides in the circumferential direction, and the second inclined surface can be formed on the faces of the engagement portion 24 that are located on both sides in the circumferential direction.

The pair of split members 21a and 21b need not be formed into the same shape (as the same parts). For example, the cage bars 16 of the cage 14 may be formed only on one split member, and the other split member may be constituted only by the annular portion 15.

In the embodiment described above, description is given of the case where the rolling element 13 is a ball. However, the rolling element 13 may be a roller. That is, the rolling bearing 10 may be a roller bearing. Further, the rolling bearing 10 may be another type of rolling bearing with the cage 14 including the two split members 21a and 21b.

According to the rolling bearing of the present invention, the engagement portions can easily be inserted into the engagement grooves when the pair of split members constituting the cage are coupled to each other, whereby the assembling workability of the rolling bearing can be improved.

What is claimed is:

1. A rolling bearing comprising:
a pair of bearing rings arranged so as to face each other in a radial direction;
a plurality of rolling elements interposed between the pair of bearing rings; and
a cage including a pair of annular portions and a plurality of cage bars connecting the pair of annular portions to each other, the cage having pockets for housing the rolling elements, each of the pockets being formed between the pair of annular portions and between the cage bars adjacent to each other in a circumferential direction, wherein:
the cage includes a first split member coupled with a second split member at respective distal end faces of the first split member and the second split member, the split members being halves of the cage split in an axial direction of the rolling bearing,
the first split member has an engagement portion that protrudes in the axial direction towards the second split member in each of the plurality of cage bars,
the second split member has an engagement groove that extends along the axial direction in each of the plurality of cage bars, and the engagement groove being configured to receive the engagement portion,
the engagement groove has an insertion port through which the engagement portion is configured to be inserted in the axial direction,
the insertion port is formed at an end of the engagement groove that is proximal to the first split member relative to the second split member, and
at least one circumferential face of the engagement groove includes a first inclined surface that increases a circumferential width of the insertion port toward the first split member, the first inclined surface extending from the distal end face of the first split member into the engagement groove in the circumferential direction,
the engagement portion includes a body portion and an engagement protrusion on a distal end of the engagement portion relative to the first split member,
the engagement portion of the first split member is configured to be connected to the cage bars of the second split member by a side opposite to the second split member in the axial direction, the engagement groove being open on a radial inner side, and
a recess extends into the first split member from the distal end face of the first split member, the recess being adjacent to and above an outer radial side of the body portion.

2. The rolling bearing according to claim 1, wherein at least one circumferential face of the engagement portion includes a second inclined surface that is arranged so as to face the first inclined surface when the first split member is coupled to the second split member, the second inclined surface increasing a circumferential width of the engagement portion toward a proximal end of the engagement portion.

3. The rolling bearing according to claim 2, wherein an inclination angle of the first inclined surface with respect to the axial direction is larger than an inclination angle of the second inclined surface with respect to the axial direction.

* * * * *